(12) United States Patent
Gorton et al.

(10) Patent No.: US 11,938,415 B2
(45) Date of Patent: Mar. 26, 2024

(54) PROCESSES AND SYSTEMS FOR RECOVERY OF SOLVENTS AND TARGET BOTANICAL COMPOUNDS

(71) Applicant: Jaxon Technologies, LLC, State College, PA (US)

(72) Inventors: Sam Gorton, Enosburg Falls, VT (US); Chris Wunz, State College, PA (US)

(73) Assignee: Jaxon Technologies, LLC, State College, PA (US)

( * ) Notice: Subject to any disclaimer, the term of this patent is extended or adjusted under 35 U.S.C. 154(b) by 0 days.

(21) Appl. No.: 17/539,438

(22) Filed: Dec. 1, 2021

(65) Prior Publication Data

US 2022/0168666 A1  Jun. 2, 2022

Related U.S. Application Data

(60) Provisional application No. 63/119,884, filed on Dec. 1, 2020.

(51) Int. Cl.
| | |
|---|---|
| *B01D 1/00* | (2006.01) |
| *B01D 3/00* | (2006.01) |
| *B01D 11/02* | (2006.01) |
| *B01J 19/18* | (2006.01) |
| *C07B 63/00* | (2006.01) |

(Continued)

(52) U.S. Cl.
CPC ............ *B01D 11/0296* (2013.01); *B01D 1/00* (2013.01); *B01D 3/00* (2013.01); *B01J 19/1875* (2013.01); *C07B 63/00* (2013.01); *C10B 47/00* (2013.01); *C10B 53/02* (2013.01); *C11B 1/108* (2013.01); *B01J 2219/00094* (2013.01)

(58) Field of Classification Search
CPC .......... B01D 11/02–0296; C11B 1/102; C11B 1/108; C11B 9/02–027; F26B 11/12; F26B 11/14; F26B 11/16; F26B 17/18–22; F26B 3/18–26; C10B 53/02
USPC .......................................... 159/25.1
See application file for complete search history.

(56) References Cited

U.S. PATENT DOCUMENTS

| 357,481 A * | 2/1887 | Hancock ................. B01D 1/00 |
| | | 202/205 |
| 4,257,945 A * | 3/1981 | Martel .................... C11B 9/025 |
| | | 426/651 |

(Continued)

FOREIGN PATENT DOCUMENTS

| CN | 206434898 U | 8/2017 |
| CN | 109646990 A | 4/2019 |

(Continued)

OTHER PUBLICATIONS

International Search Report and Written Opinion of corresponding international application No. PCT/US2021/061355 dated Mar. 23, 2022, all enclosed pages cited.

*Primary Examiner* — Jonathan Luke Pilcher
(74) *Attorney, Agent, or Firm* — BURR & FORMAN LLP (57) ABSTRACT

Processes and systems for the recovery of solvents from a feedstock are provided, as well as processes and systems for the recovery of target botanical compounds. The processes and systems include a heated mixing device, in which a feedstock can be simultaneously mixed and heated to vaporize and release a solvent or botanical compound from the feedstock. The vaporized solvent or botanical compound can be condensed and collected as recovered solvent or a recovered botanical compound.

8 Claims, 4 Drawing Sheets

(51) Int. Cl.
*C10B 47/00* (2006.01)
*C10B 53/02* (2006.01)
*C11B 1/10* (2006.01)

(56) References Cited

U.S. PATENT DOCUMENTS

| | | |
|---|---|---|
| 8,946,491 B2 | 2/2015 | Radtke et al. |
| 10,570,350 B1 * | 2/2020 | Vanaman ................ B01D 3/12 |
| 10,617,974 B2 | 4/2020 | Thomas |
| 10,765,965 B1 | 9/2020 | Sherwood et al. |
| 2018/0078874 A1 | 3/2018 | Thomas |
| 2018/0140965 A1 * | 5/2018 | Flora ........................ C11B 1/10 |
| 2019/0083902 A1 * | 3/2019 | Nevitt ................ B01D 11/0257 |
| 2019/0151771 A1 | 5/2019 | Russell |
| 2020/0056115 A1 | 2/2020 | Vanaman |
| 2020/0080021 A1 | 3/2020 | Thomas |

FOREIGN PATENT DOCUMENTS

| | | |
|---|---|---|
| JP | S63315139 A | 12/1988 |
| WO | 2020061712 A1 | 4/2020 |
| WO | 2020123522 A1 | 6/2020 |

* cited by examiner

PROCESSES AND SYSTEMS FOR RECOVERY OF SOLVENTS AND TARGET BOTANICAL COMPOUNDS

TECHNICAL FIELD

Example embodiments generally relate to solvent recovery and botanical compound recovery from a feedstock, such as a botanical biomass.

BACKGROUND

Current processes for the extraction of targeted botanical components, such as thermally-sensitive, low boiling point botanical compounds, from plant and other biomass materials typically require a solvent-based extraction process, which is usually either a hydrocarbon-based solvent (e.g. an alcohol or butane) or a high- pressure (e.g. supercritical $CO_2$) gas. These systems can be tedious and hydrocarbon-based solvents are often highly flammable and any usage of high-pressure gases as solvents presents significant safety concerns as well. Additionally, produces extracted from these processes and systems may contain unwanted constituents and/or ballasts that harm the purity, odor, biocompatibility, and/or other characteristics of the extracted compounds. As a result, the products generally require additional processing, especially purification and solvent clean-up/recovery, downstream of the extraction process. Additional drawbacks to such processes relate to the handling of the spent feedstock (e.g., target botanical compounds have mostly been extracted therefrom) after being subjected to the extraction process. For instance, the spent feedstock may be laden with undesirable solvents and may not be easily disposed of due to environmental concerns and/or regulations.

SUMMARY OF INVENTION

One or more embodiments of the invention may address one or more of the aforementioned problems. Certain embodiments according to the invention provide a process of recovering a solvent from a feedstock. In accordance with certain example embodiments, the process may comprise the following steps: (i) feeding the feedstock into a heated mixing device, wherein the feedstock includes the solvent for recovery; (ii) simultaneously mixing and heating the feedstock within the heated mixing device; (iii) forming a vaporized solvent within the heated mixing device; (iv) passively or actively passing the vaporized solvent from the heated mixing device into a condenser; and (v) condensing the vaporized solvent in the condenser to form a recovered solvent.

In another aspect, the invention provides a botanical evaporation process for recovering a botanical compound from a feedstock. In accordance with certain example embodiments, the method may comprise the following steps: (i) feeding the feedstock into a heated mixing device, wherein the feedstock includes the botanical compound for recovery; (ii) simultaneously mixing and heating the feedstock within the heated mixing device under a vacuum; (iii) forming a vaporized botanical compound within the heated mixing device; (iv) passing the vaporized botanical compound from the heated mixing device into a condenser; and (v) condensing the vaporized botanical compound in the condenser to form a recovered botanical compound.

In yet another aspect, the invention provides a system for the recovery of solvent and/or botanical compounds from a feedstock. In accordance with certain example embodiments, the system may comprise a ribbon blender assembly comprising (a) a feedstock inlet, (b) an internal chamber configured to house a feedstock material, (c) a jacket configured to receive a heating medium and transfer heat from the heating medium to the internal chamber, (d) one or more ribbons configured to agitate the feedstock material located in the internal chamber, (e) a feedstock discharge, and (f) a vapor outlet. The system may also include a heat source (e.g., steam supply, heated oil supply, etc.) in operative communication with the jacket of the ribbon blender assembly. The system may also include a condenser in operative communication with the vapor outlet. In accordance with certain example embodiments, the system may be devoid of a motive gas inlet for contacting the feedstock with a motive gas stream.

BRIEF DESCRIPTION OF THE DRAWING(S)

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout, and wherein.

DETAILED DESCRIPTION

As used herein the term "or" is used as the logical or where any one or more of the operands being true results in the statement being true. As used herein, the phrase "based on" as used in, for example, "A is based on B" indicates that B is a factor that determines A, but B is not necessarily the only factor that determines A.

According to various example embodiments, apparatuses, methods, and systems are provided herein for performing thermal recovery of solvents and targeted compounds from various feedstock materials, such as one or more biomasses. In accordance with certain example embodiments, the term "feedstock" may comprise non-sized-reduced plant material or biomass and/or a size-reduced plant material or biomass. For example, a size-reduced plant material or biomass may be provided in chopped, cut, or ground. Examples of such biomasses may include, for example, botanical biomasses. One example biomass includes a hemp biomass.

As used herein a "botanical compound" may comprise any compound naturally found in a plant. For example, a "botanical compound" may include cannabinoids from cannabis, such as tetrahydrocannabinol (THC), cannabidiol (CBD), cannabigerol (CBG), and cannabichrome (CBC), terpenoids (mono-, sesqui-, di-, etc.) and terpenes. Terpenes, for example, are a class of natural products consisting of compounds with the formula (C5H8)n. These unsaturated hydrocarbons are produced predominantly by plants, particularly conifers, and may be further classified by the number of carbons: monoterpenes (C10), sesquiterpenes (C15), diterpenes (C20), etc. Terpenes have a boiling points that scale with molecular size: terpenes, sesquiterpenes, and diterpenes respectively at 110, 160, and 220° C. [Any other specific botanical compounds that we should list?]

For instance, certain example embodiments may utilize a heated (or heatable) mixing device (e.g., a jacketed ribbon blender assembly in which a heat transfer medium may be flowed through the jacket to impart heat to the contents within the jacketed ribbon blender assembly) in a process or system to recovery solvent that may be present from a processed or spent biomass (e.g., the biomass has been subjected to a solvent-based extraction process to recover targeted botanical compounds from the biomass). For the recovery of solvent from a processed or spent feedstock (e.g., the feedstock has already had the target botanical compounds extracted by a solvent), the spent feedstock may be added to a heated (or heatable) mixing device (e.g., a ribbon blender assembly or the like). The feedstock may then mixed and heated under atmospheric pressure or under a vacuum such that entrained or "bound" solvent within the feedstock is vaporized/evaporated and condensed in a condenser, from which the solvent may be deposited in a catch tank so that the recovered solvent (in liquid form) can be re-used. In accordance with certain example embodiments, it may be preferred to provide generally uniform mixing and thus heat transfer into the feedstock. Additionally or alternatively, certain example embodiments may utilize a heated (or heatable) mixing device in a process or system for the extraction or recovery of thermally-sensitive, low boiling point botanical compounds (e.g., terpenes from plants such as hemp biomass). For the extraction of target botanical compounds (e.g., terpenes), the process may include loading a feedstock (e.g., hemp biomass) into a heated (or heatable) mixing device (e.g., a ribbon blender assembly or the like). The feedstock may be processed under vacuum along with the application of heat and mixing. In accordance with certain example embodiments, it may be preferred to provide generally uniform mixing and thus heat transfer into the feedstock. The low boiling point botanical target compounds will evaporate or vaporize and effectively be pulled out of the heated (or heatable) mixing device (e.g., a ribbon blender assembly) via the vacuum. In this regard, the target compounds are extracted or vacuum distilled/evaporated from the feedstock. The vaporized target botanical compounds may be condensed in a condenser and deposited into a catch tank or "cold trap". In accordance with certain example embodiments, the process effectively separates the target botanical compounds (e.g., terpenes) from the feedstock (e.g., hemp biomass) without the use of a solvent. For example, the process may be devoid of the use of any organic solvents. In this regard, many current processes for extracting such compounds, as noted above, rely on certain solvents for the extraction of the target compounds out of the feedstock.

In accordance with certain example embodiments, the systems and/or processes for recovering a solvent from a feedstock may be devoid of a motive gas stream that is in contact with the feedstock during processing. A motive gas, for instance, may include an externally supplied gas (e.g., from outside the heated mixing device whether from the local environment, or from a separate gas supply, or recirculated vapor) that is flowed or passed over and/or through the feedstock during heating and/or mixing. The use of such a motive gas unnecessarily complicates the system by requiring additional unit operations (e.g., equipment) and processing control considerations. In this regard, the use of a motive gas is not utilized in accordance with certain example embodiments. For instance, a system for the recovery of solvent from a feedstock may be devoid of a motive gas inlet for contacting the feedstock with a motive gas stream.

In accordance with certain example embodiments, the systems and/or processes for recovering a botanical compound from a feedstock may be devoid of a motive gas stream that is in contact with the feedstock during processing. A motive gas, for instance, may include an externally supplied gas (e.g., from outside the heated mixing device whether from the local environment, or from a separate gas supply, or recirculated vapor) that is flowed or passed over and/or through the feedstock during heating and/or mixing. The use of such a motive gas may at first glance be thought to facilitate removal of the target botanical compound from the feedstock and into the motive gas, the use of a motive gas unnecessarily complicates the system by requiring additional unit operations (e.g., equipment) and processing control considerations. In this regard, the use of a motive gas is not utilized in accordance with certain example embodiments. For instance, a system for the recovery of a botanical compound from a feedstock may be devoid of a motive gas inlet for contacting the feedstock with a motive gas stream.

In one aspect, certain embodiments according to the invention provide a process of recovering a solvent from a feedstock. In accordance with certain example embodiments, the process may comprise the following steps: (i) feeding the feedstock into a heated mixing device, wherein the feedstock includes the solvent for recovery; (ii) simultaneously mixing and heating the feedstock within the heated mixing device; (iii) forming a vaporized solvent within the heated mixing device; (iv) passively or actively passing the vaporized solvent from the heated mixing device into a condenser; and (v) condensing the vaporized solvent in the condenser to form a recovered solvent.

In accordance with certain example embodiments, the step of heating the feedstock may comprise or consist of indirectly heating the feedstock via the transfer of heat from a heating medium (e.g., heat transfer fluid such as steam or heated oil) that is not in direct and/or physical contact with the feedstock. Once heating an mixing has begun, initially heated components of the feedstock may supply heat to other less-heated components of the feedstock during mixing, but the main or only source of external heat into the heated mixing device may come from the heating medium being circulated or passed through one or more jackets of the heated mixing device. For instance, the heated mixing device may include one or more jackets through which the heating medium transfers heat to the feedstock. As discussed in greater detail below, the heated mixing device in accordance with certain example embodiments may comprises a jacketed ribbon blender assembly. In this regard, the feedstock may be thoroughly mixed within the jacketed ribbon blender assembly to facilitate homogenous heating and physical mixing throughout the entirety of the feedstock.

In accordance with certain example embodiments, the feedstock may have an original solvent content, in which the process removes (e.g., removes and recovers) from about 90% to about 100% of the solvent content, such as at least about any of the following: 90, 92, 94, 95, 96, 98, and 99%, and/or at most about any of the following: 100, 99.9, 99.8, 99.7, 99.6, 99.5, 99.4, 99.3, 99.2, 99.1, and 99%. By way of example only, a feedstock may have an original solvent content of 10 pounds (or 10% by weight) and the process may remove (e.g., remove and recover) 99% of the original solvent content, such that the processed feedstock has a final solvent content of 0.1 pounds (or 0.1% by weight) of solvent. Additionally or alternatively, the feedstock may have an original solvent content from about 10 to about 40% by weight, such as at least about any of the following: 10, 12, 15, 18, and 20% by weight, and/or at most about any of the following: 40, 38, 35, 32, 30, 28, 25, 22, and 20% by weight. In this regard, processes and systems for recovering a solvent from a feedstock may effectively handle material with a significant amount of solvent present within the feedstock.

In accordance with certain example embodiments, the step of heating the feedstock within the heated mixing device may comprise heating the feedstock to an elevated temperature, in which the elevated temperature is sufficiently high enough to volatilize one or more solvents within the feedstock. For example, the elevated temperature may comprise the boiling point of the targeted solvent or at least about 5° C., or about 10° C., or about 20° C. above the boiling point of the targeted solvent. In accordance with certain example embodiments, the elevated temperature may comprise from about 180 to about 250° C., such as at least about any of the following: 180, 190, 200, 210, and 220° C., and/or at most about any of the following: 250, 245, 240, 235, 230, 225, and 220° C. Additionally or alternatively, the heating and/or mixing steps may be performed at atmospheric pressure or under a vacuum. If the process is carried out under a vacuum, the elevated temperature necessary for volatilizing the targeted solvent may be reduced. In such systems, the heated mixing device may be operatively connected to a vacuum source (e.g., a vacuum pump).

In accordance with certain example embodiments, the residence time of the feedstock being subjected to heating and/or mixing may comprise from about 0.5 to about 15 hours, such as at least about any of the following: 0.5, 1, 1.5, 2, 2.5, 3, 5, 8, and 10 hours, and/or at most about any of the following: 15, 14, 13, 12, 11, and 10 hours. In accordance with certain example embodiments, the residence time may be impacted by the choice of heating medium and/or the intensity of mixing of the feedstock within the heated mixing device. For instance, a heating medium that also provides a latent heat transferred to the feedstock alone or coupled with vigorous solids mixing may reduce the residence time as heat transfer efficiency and mass transfer efficiencies may be increased.

In accordance with certain example embodiments, the solvent comprises or consists of one or more organic solvents. Organic solvents, for example, may include ethanol, heptane, hexane, isopropanol, methanol, acetone, butane, propane or other comparably boiling hydrocarbon or organic solvents. Certain low-boiling solvents may require lower condenser temperatures and appropriate chilling equipment for providing the chilling duty to the solvent condenser.

As noted above, the systems and/or processes for recovering a solvent from a feedstock, in accordance with certain example embodiments, may be devoid of a motive gas stream that is in contact with the feedstock during processing. In this regard, the processes and/or systems may be considered as "closed" processes and/or systems. For instance, the feedstock may be charged as a batch to the heated mixing device and sealed to prevent external air and/or gas from entering into the heated mixing device. The heated mixing device may comprises a vent line or vapor outlet that allows the vaporized solvent to escape from the heated mixing device for subsequent condensing and collection. The vent line, for example, may optionally include a one-way valve to prevent any flow from entering the heated mixing device via the vent line. In a similar manner, the feedstock may be charged in a continuous or semi-continuous manner to the heated mixing device via a vacuum sealed metering valve that charges material into the heated mixing device while maintaining a vapor seal across the valve. In this regard, the heated mixing device may also include a feedstock outlet in which processed feedstock is discharged from the heated mixing device via a second vacuum sealed metering valve. In this external air or gas may be prevented from entering into the heated mixing device during operation.

Figure 1:
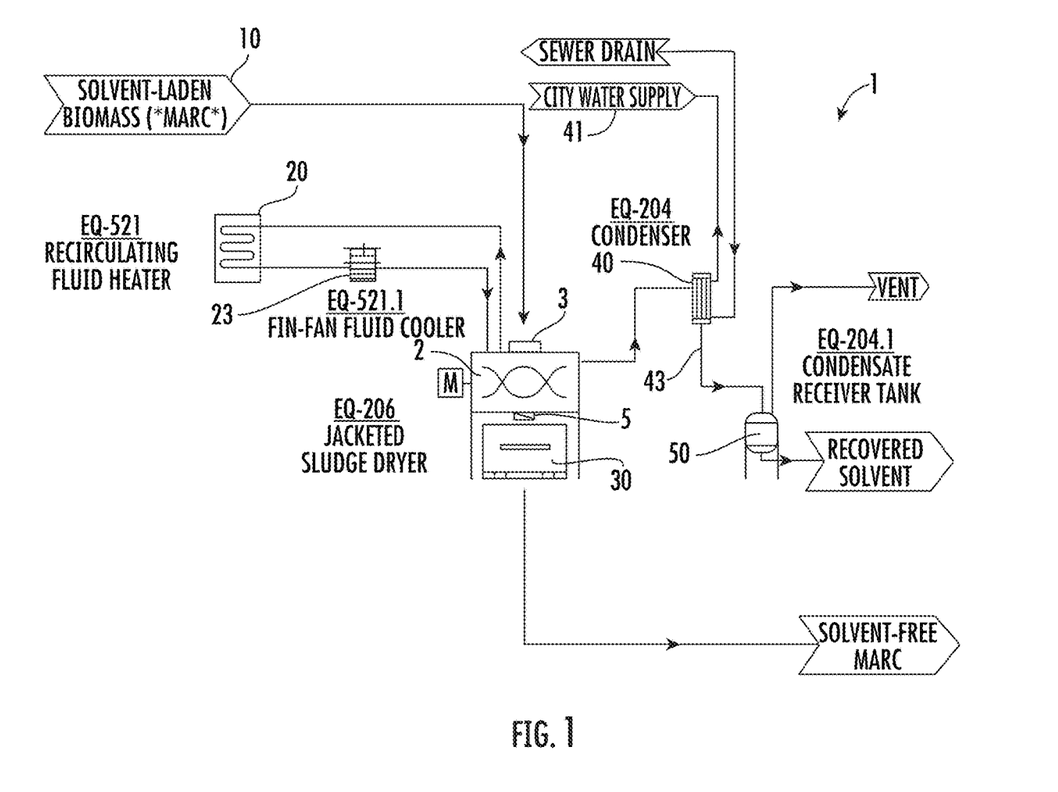
FIG. 1 illustrates a schematic of a process and system for the recovery of solvent from a feedstock.

FIG. 1, for example, illustrates a schematic of a process and system 1 for the recovery of solvent from a feedstock. As shown in FIG. 1, the process may include a heated mixing device 2 having a feedstock inlet 3 and a feedstock outlet 5. Solvent-laden feedstock 10 is charged into the heated mixing device 2 via feedstock inlet 3. The heated mixing device 2 includes a jacket coupled to a heat source or heat loop 20, which may include a fin-fan fluid cooler 23. The heated mixing device 2 may agitate the charged feedstock while the heat source or heat loop 20 may indirectly supply heat to the feedstock material within the heated mixing device. As the solvent present within the feedstock vaporizes, it is allowed to pass or drawn into a condenser 40 that has a cooling source or cooling loop 41 that promotes condensation of the vaporized solvent in the condenser. The condensed solvent exits the condenser 40 via exit 43 and may be collected to a vented catch tank 50. After the desired level of solvent has been collected, operation of the heated mixing device 2 may be halted and the feedstock may be discharged via feedstock outlet 5 and optionally deposited into a collection bin 30. In this regard, the present invention provides both processes and systems for the recovery of a solvent (e.g., an organic solvent) from a feedstock.

In another aspect, the invention provides a botanical evaporation process for recovering a botanical compound from a feedstock. In accordance with certain example embodiments, the method may comprise the following steps: (i) feeding the feedstock into a heated mixing device, wherein the feedstock includes the botanical compound for recovery; (ii) simultaneously mixing and heating the feedstock within the heated mixing device under a vacuum; (iii) forming a vaporized botanical compound within the heated mixing device; (iv) passing the vaporized botanical compound from the heated mixing device into a condenser; and (v) condensing the vaporized botanical compound in the condenser to form a recovered botanical compound.

In accordance with certain example embodiments, the step of heating the feedstock may comprise or consist of indirectly heating the feedstock via the transfer of heat from a heating medium (e.g., heat transfer fluid such as steam or heated oil) that is not in direct and/or physical contact with the feedstock. Once heating an mixing has begun, initially heated components of the feedstock may supply heat to other less-heated components of the feedstock during mixing, but the main or only source of external heat into the heated mixing device may come from the heating medium being circulated or passed through one or more jackets of the heated mixing device. For instance, the heated mixing device may include one or more jackets through which the heating medium transfers heat to the feedstock. As discussed in greater detail below, the heated mixing device in accordance with certain example embodiments may comprises a jacketed ribbon blender assembly. In this regard, the feedstock may be thoroughly mixed within the jacketed ribbon blender assembly to facilitate homogenous heating and physical mixing throughout the entirety of the feedstock.

In accordance with certain example embodiments, the feedstock may have an original target botanical compound (e.g., terpenes) content, in which the process removes (e.g., removes and recovers) from about 90% to about 100% of the target botanical compound (e.g., terpenes) content, such as at least about any of the following: 90, 92, 94, 95, 96, 98, and 99%, and/or at most about any of the following: 100, 99.9, 99.8, 99.7, 99.6, 99.5, 99.4, 99.3, 99.2, 99.1, and 99%. By way to example only, a feedstock may have an terpene content of 5 pounds (or 5% by weight) and the process may remove (e.g., remove and recover) 99% of the original terpene content, such that the processed feedstock has a final terpene content of 0.05 pounds (or 0.05% by weight) of terpenes. Additionally or alternatively, the feedstock may have an original terpene content from about 1 to about 10% by weight, such as at least about any of the following: 1, 2, 3, 4, and 5% by weight, and/or at most about any of the following: 10, 9, 8, 7, 6, and 5% by weight. Additionally or alternatively, the feedstock may have an original moisture (i.e., water) content from about 20 to about 75% by weight, such as at least about any of the following: 20, 30, 40, 50, 55, 60 and 65% by weight, and/or at most about any of the following: 75, 70, and 65% by weight. In accordance with certain example embodiments, the process would greatly "deterpenate" the a hemp-biomass feedstock (e.g., remove and recover the terpenes in the originally charged feedstock as noted above) and dry the hemp-biomass feedstock while retaining cannabinoids and reducing the particle size of the hemp-biomass feedstock.

In accordance with certain example embodiments, the feedstock (e.g., a hemp-biomass material), may be substantially devoid (e.g., less than 1% by weight) or devoid of an organic solvent (e.g., solvents having a carbon-based structure). In this regard, the botanical evaporation process for recovering a botanical compound (e.g., terpenes) from a feedstock may comprise an organic solventless extraction process. Additionally or alternatively, the feedstock may comprise a moisture (i.e., water) content from about 20 to about 75% by weight, such as at least about any of the following: 20, 30, 40, 50, 55, 60, and 65% by weight, and/or at most about any of the following: 75, 70, and 65% by weight. By way of example only, the feedstock may comprises a hemp-biomass material that is devoid of one or more organic solvents while including a moisture content as disclosed herein.

In accordance with certain example embodiments, the step of heating the feedstock within the heated mixing device may comprise heating the feedstock to an elevated temperature, in which the elevated temperature is sufficiently high enough to volatilize one or more target botanical compounds (e.g., terpenes) within the feedstock. For example, the elevated temperature may comprise the boiling point of the targeted solvent or at least about 5° C., or about 10° C., or about 20° C. above the boiling point of the targeted solvent. In accordance with certain example embodiments, the elevated temperature may comprise from about 150 to about 250° C., such as at least about any of the following: 150, 160, 170, 180, 190, 200, 210, and 220° C., and/or at most about any of the following: 250, 245, 240, 235, 230, 225, and 220° C. Additionally or alternatively, the heating and/or mixing steps may be performed under a vacuum. If the process is carried out under a vacuum, the elevated temperature necessary for volatilizing the targeted solvent may be reduced. The heated mixing device may be operatively connected to a vacuum source (e.g., a vacuum pump). The heating and/or mixing steps, for example, may be performed under a vacuum that may comprise from 100 to 5000 microns absolute pressure, such as at least about any of the following: 100, 200, 400, 500, 500, 800, 1000, 1200, 1500, 1800, 2000, 2200, and 2500 microns absolute pressure, and/or at most about any of the following: 5000, 4800, 4500, 4200, 4000, 3800, 3500, 3200, 3000, 2800, and 2500 microns absolute pressure. In accordance with certain example embodiments, the targeted botanical compounds comprise terpenes and the process is operated at these strong vacuum values to facilitate and/or ensure operation at the lowest possible operating temperature to retain cannabinoids in the feedstock. In this regard, the terpenes may be selectively recovered from the feedstock while the cannabinoids may be selectively left behind in the feedstock.

In accordance with certain example embodiments, the residence time of the feedstock being subjected to heating and/or mixing for the recovery of one or more targeted botanical compounds may comprise from about 0.5 to about 15 hours, such as at least about any of the following: 0.5, 1, 1.5, 2, 2.5, 3, 5, 8, and 10 hours, and/or at most about any of the following: 15, 14, 13, 12, 11, and 10 hours. In accordance with certain example embodiments, the residence time may be impacted by the choice of heating medium, the degree of vacuum pulled on the system, and/or the intensity of mixing of the feedstock within the heated mixing device. For instance, a heating medium that also provides a latent heat transferred to the feedstock alone or coupled with vigorous solids mixing may reduce the residence time as heat transfer efficiency and mass transfer efficiencies may be increased.

As noted above, the systems and/or processes for recovering a botanical compound from a feedstock, in accordance with certain example embodiments, may be devoid of a motive gas stream that is in contact with the feedstock during processing. In this regard, the processes and/or systems may be considered as "closed" processes and/or systems. For instance, the feedstock may be charged as a batch to the heated mixing device and sealed to prevent external air and/or gas from entering into the heated mixing device. The heated mixing device may comprises a vacuum line or vapor outlet by which vacuum is pulled on the heated mixing device and allows the vaporized botanical compound(s) to escape from the heated mixing device for subsequent condensing and collection. The vacuum line, for example, may optionally include a one-way valve to prevent any flow from entering the heated mixing device via the vapor line. In a similar manner, the feedstock may be charged in a continuous or semi-continuous manner to the heated mixing device via a vacuum sealed metering valve that charges material into the heated mixing device while maintaining a vapor seal across the valve. In this regard, the heated mixing device may also include a feedstock outlet in which processed feedstock is discharged from the heated mixing device via a second vacuum sealed metering valve. In this external air or gas may be prevented from entering into the heated mixing device during operation.

In accordance with certain example embodiments, the process may comprise an optional step of pre-grinding or otherwise reducing the average size of the feedstock prior to charging into the heated mixing device. In this regard, the size-reduced feedstock may have an increased surface area that facilitates more efficient heat and/or mass transfer.

In accordance with certain example embodiments, the heated mixing device may further comprises microwave functionality to provide another modality of heating and/or drying of the feedstock. The addition of microwave heat may provide a more precise, uniform, and consistent temperature profile throughout the heated mixing device, as well as reducing residence times. In this regard, the heated mixing device may comprise one or more microwave generators incorporated into or on the heated mixing device. The microwave generators are not particularly limiting so long as the microwave generators are capable of dielectrically heating the feedstock within the heated mixing device by interfacial polarization, which is also known as Maxwell-Wagner-Sillars polarization. A microwave generator may comprise, for example, a cavity magnetron. A microwave generator may typically emit microwave radiation of a frequency that is capable of dielectrically heating the feedstock while it is in the heated mixing device. For example, the microwave generator may be configured to emit microwave radiation at a frequency that favors absorption by the targeted botanical compound(s) relative to the plant material (e.g., cellulose and/or polysaccharides) to avoid thermal decomposition or combustion of the plant material component of the feedstock. The microwave generator, for example, may be a variable frequency microwave generator that emits microwave radiation at one or more selectable frequencies. In accordance with certain example embodiments, the microwave generator may comprise a bandpass filter that favors the transmission of microwave radiation corresponding to frequencies of interest (e.g., promote selective heating of targeted botanical compounds). In accordance with certain example embodiments, the microwave generator may be configured to dynamically alter the power of microwave radiation emitted from the microwave generator, for example, in response to feedback received from a temperature sensor or reading of the feedstock within the heated mixing device. In this regard, certain example embodiments provide a steam distillation, for example, of terpenes coupled with microwave radiative heating in the heated mixing device (e.g., a ribbon blender assembly).

Figure 2:
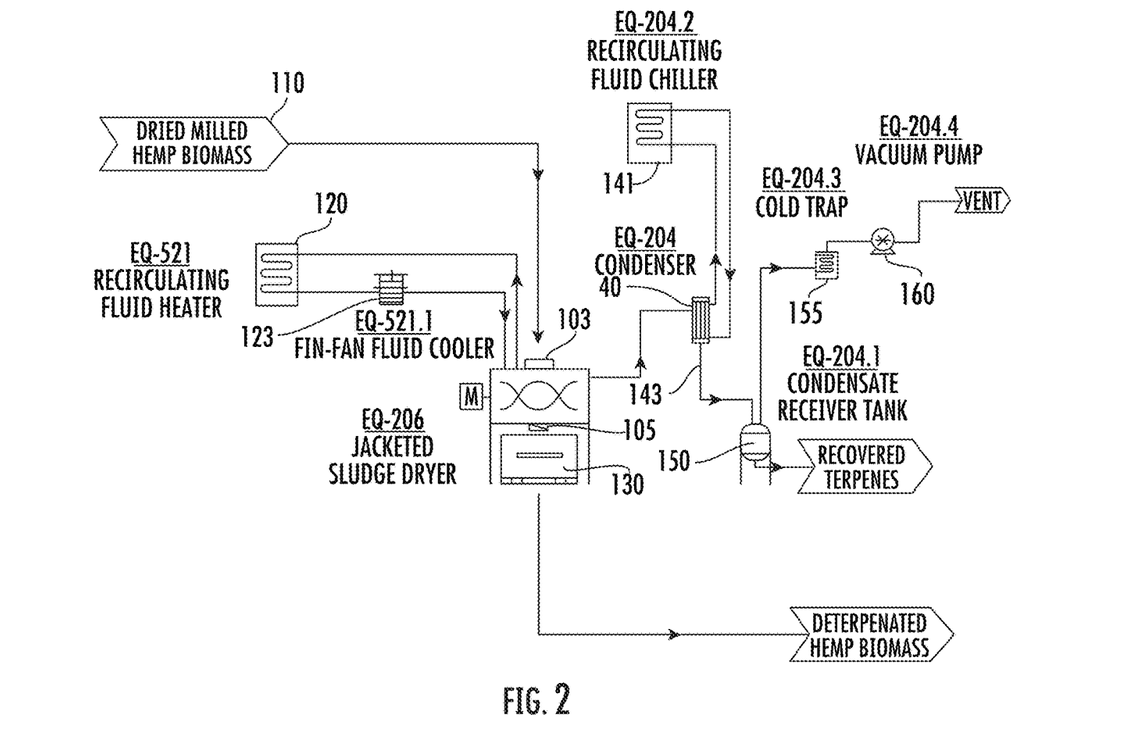
FIG. 2 illustrates a schematic of a process and system for the recovery of a botanical compound from a feedstock.

FIG. 2, for example, illustrates a schematic of a process and system 100 for the recovery of a botanical compound from a feedstock. As shown in FIG. 2, the process may include a heated mixing device 102 having a feedstock inlet 103 and a feedstock outlet 105. Feedstock 110 having one or more targeted botanical compounds is charged into the heated mixing device 102 via feedstock inlet 103. The heated mixing device 102 includes a jacket coupled to a heat source or heat loop 120, which may include a fin-fan fluid cooler 123. The heated mixing device 102 may agitate the charged feedstock while the heat source or heat loop 120 may indirectly supply heat to the feedstock material within the heated mixing device. As the targeted botanical compound present within the feedstock vaporizes, it is allowed to pass or drawn into a condenser 140 that has a cooling source or cooling loop 141 that promotes condensation of the vaporized botanical compound in the condenser. The condensed botanical compound exits the condenser 140 via exit 143 and may be collected to a catch tank 150. The process may be performed under vacuum by use of a vacuum pump 160, which pulls and maintained a vacuum in the heated mixing device 102 through a cold trap 155, the catch tank 150, and the condenser 140. After the desired level of botanical compound(s) has been collected, operation of the heated mixing device 102 may be halted and the feedstock may be discharged via feedstock outlet 105 and optionally deposited into a collection bin 130. In this regard, the present invention provides both processes and systems for the recovery of a botanical compounds (e.g., terpenes) from a feedstock.

In any of the embodiments (e.g., processes and/or systems for recovery of solvent from a feedstock or for recovery of a botanical compound from a feedstock), the heated mixing device may comprise a variety of configurations. The heated mixing device, for example, a jacketed V-blender, a Rotacone, a Nauta-mixer, rotary drum, or a ribbon blender assembly. In accordance with certain example embodiments, the heated mixing device comprises a ribbon blender assembly. The ribbon blender assembly, for example, may comprise (a) a feedstock inlet, (b) an internal chamber configured to house a feedstock material, in which the feedstock collects in a trough of the ribbon blender assembly, (c) a jacket configured to receive a heating medium and transfer heat from the heating medium to the internal chamber, (d) one or more ribbons configured to agitate the feedstock material located in the internal chamber, (e) a feedstock discharge, and (f) a vapor outlet. A ribbon blender assembly, according to some example embodiments, may comprise a mixing machine (e.g., an industrial mixing machine), including a U-shaped steel trough shell. The ribbon blender assembly may also include a horizontal shaft mounted with a ribbon-like (e.g., spiral or helical shaped) mixing element which agitates the contents of the trough shell via rotational action caused by a motor coupled to the shaft. According to some example embodiments, the mixing element may include inner (smaller diameter) agitator and an outer (larger diameter) agitator. The contents or media of the trough shell may be introduced via an ingredient inlet aperture into the trough shell. The mixing action of the ribbon blender assembly may cause both radial and axial mixing, ensuring rapid and even mixing of both solid and solid-liquid media. The trough shell of the ribbon blender assembly may also be jacketed to enable heating, cooling, and drying of the process media. Additionally, the trough shell may also, according to some example embodiments, be sealed and vacuum-rated to enable low-temperature, pressure-controlled drying applications.

Due to the functionality and scalability, the ribbon blender assembly, according to some example embodiments, may have wide application in mixing and drying of food, pharmaceutical, and other industrial goods. Additionally, according to some example embodiments, such ribbon blender assemblies, or other similar mixing machines, have not been applied or implemented in the context of large-volume solvent or valuable extract recovery (e.g., targeted botanical compounds). Given the capability to rapidly and evenly mix (and therefore heat) solid media, especially under vacuum, such ribbon blender assemblies my enable novel applications in the context of bulk extraction of thermally-sensitive target compounds, for example, in the botanical extraction industry, regardless of solvent choice.

Figure 3:
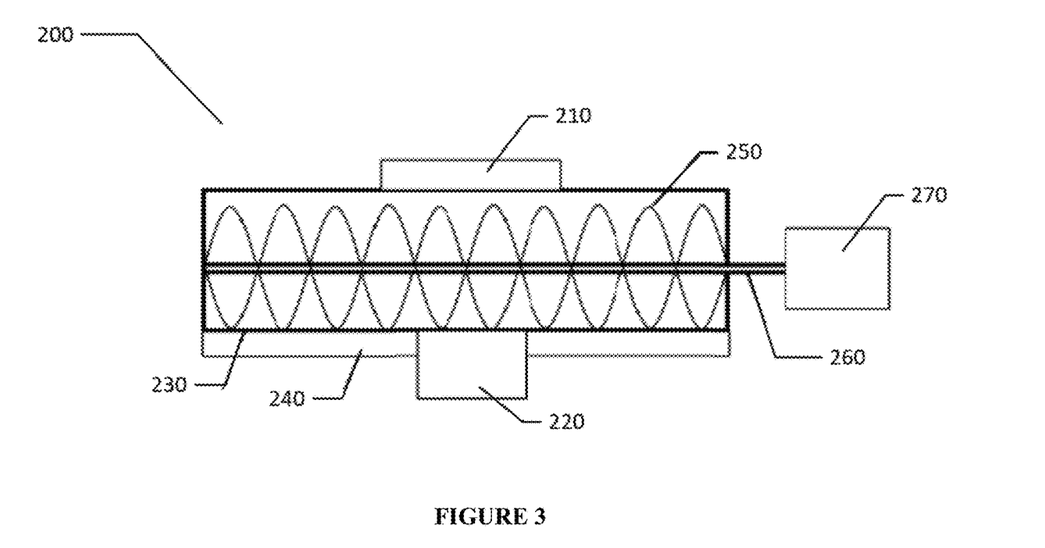
FIG. 3 illustrates a mixing device embodied as a ribbon blender for batch processing of a feedstock for solvent recovery or botanical compound recovery.

FIG. 3, for instance, illustrates a ribbon blender assembly for batch processing of a feedstock for solvent recovery or botanical compound recovery. As illustrated by FIG. 3, the ribbon blender assembly 200 may include a feedstock inlet 210 through with feedstock may be charged into an internal chamber, at least partially, defined by a generally U-shaped trough or shell 230. The ribbon blender assembly 200 also includes a feedstock discharge 220 through which the processed feedstock may be removed from the internal chamber. The ribbon blender assembly 200 may also include a jacket 240 configured to receive a heating medium and transfer heat from the heating medium to the internal chamber. The ribbon blender assembly 200 may also include one or more ribbons 250 mounted on a rotating shaft 260, which is driven my motor 270.

Figure 4:
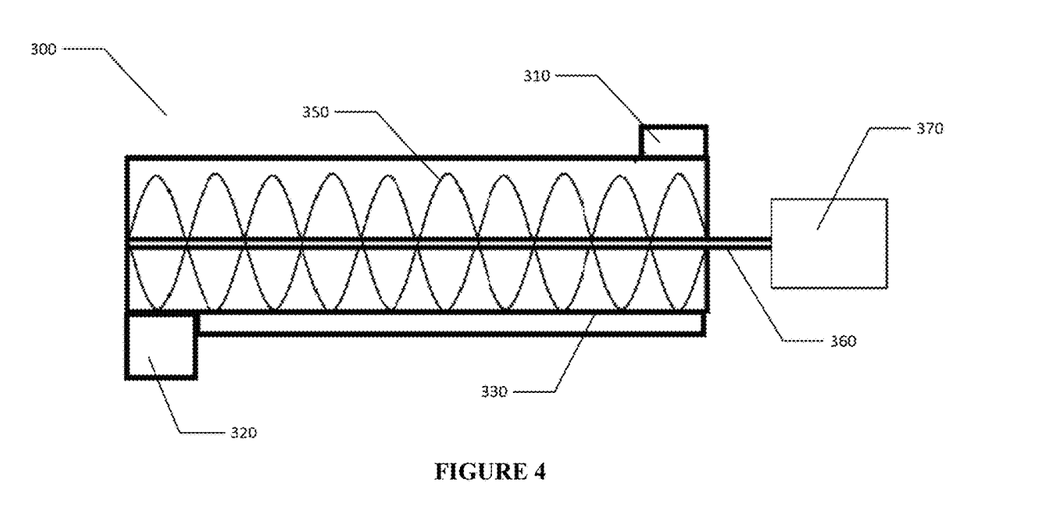
FIG. 4 illustrates a mixing device embodied as a ribbon blender for continuous or batch processing of a feedstock for solvent recovery or botanical compound recovery.

In accordance with certain example embodiments, the heated mixing device may comprise a ribbon blender assembly configured for continuous or batch processing of a feedstock. FIG. 4, for example, illustrates a ribbon blender assembly 300 for continuous or batch processing of a feedstock for solvent recovery or botanical compound recovery. As illustrated by FIG. 4, the ribbon blender assembly 300 may include feedstock inlet 310 that is located at or proximate a first end of the ribbon blender assembly, and the feedstock discharge 320 is located at or proximate a second end of the ribbon blender assembly. In this regard, fresh feedstock may continuously be charged through the feedstock inlet 310 (e.g., via a vacuum-sealed metering valve) and processed feedstock may continuously be discharged through the feedstock discharge 320 (e.g., via a second vacuum-sealed metering valve). The ribbon blender assembly 300 may also include an internal chamber, at least partially, defined by a generally U-shaped trough or shell 330. The ribbon blender assembly 300 may also include a jacket 340 configured to receive a heating medium and transfer heat from the heating medium to the internal chamber. The ribbon blender assembly 300 may also include one or more ribbons 350 mounted on a rotating shaft 230, which is driven my motor 370.

Figure 5:
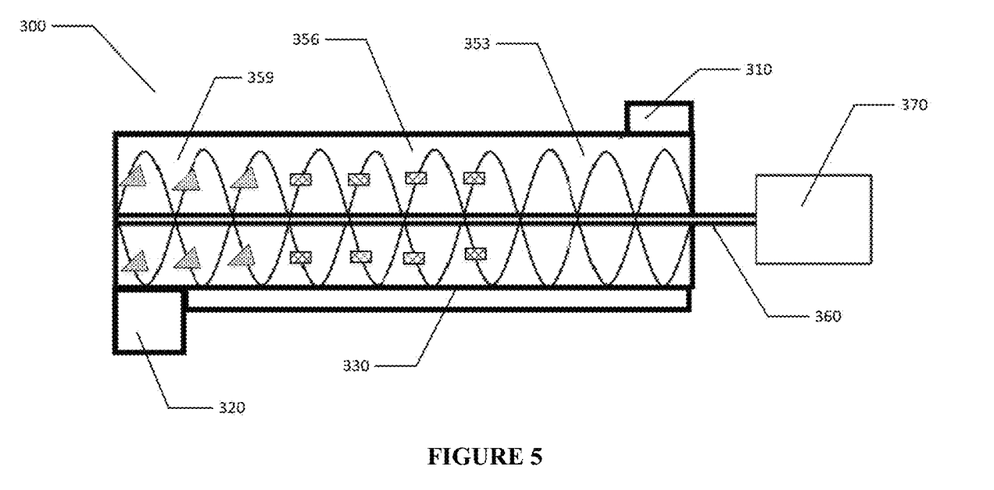
FIG. 5 illustrates a mixing device embodied as a ribbon blender for continuous or batch processing of a feedstock for solvent recovery or botanical compound recovery, in which the ribbon may have multiple configurations along the length of the ribbon blender.

FIG. 5 illustrates a mixing device embodied as a ribbon blender assembly, in accordance with certain example embodiments, for continuous or batch processing of a feedstock for solvent recovery or botanical compound recovery, in which the ribbon may have multiple configurations along the length of the ribbon blender. As illustrated by FIG. 5, the ribbon may include a first section 353 having a first configuration that is proximate the feedstock inlet 310 and a second section 359 having a second configuration proximate the feedstock discharge 320. The ribbon of FIG. 5 also includes an optional third section 356 including a third configuration and being located between the first section and the third section. In this regard, certain example embodiments may comprise one or more ribbons that vary in configuration along the length of the ribbon blender assembly (e.g., from the inlet end to the discharge end).

In this regard, for example, the ribbon blender assembly may comprise a multi-zoned ribbon blender assembly in which the configuration of the one or more ribbons is different, for example, at the inlet end as compared to the middle, and/or exit end of the ribbon blender assembly. For example, a first section of the ribbon blender assemble may warrant blending requirements that are different than those in the middle or near the exit of the ribbon blender assembly. For example, certain example embodiments may provide more axial movement of the feedstock at or proximate the discharge end due to a first configuration of ribbon(s) and more radial mixing near of the feedstock at or proximate the inlet of the ribbon blender assembly. In accordance with certain example embodiments, the aspect ratio of the blender "trough" may be adjusted to elongate the trough relative to its diameter. With an inlet at the top of one end of the ribbon blender shell and an outlet at the bottom of the opposite end, which both being vapor-locked, a continuous "plug-flow" device may be realized.

In accordance with certain example embodiments, the mixing intensity may be controlled by adjusting the speed of the blender shaft. By way of example, for a 36-inch diameter vessel and approximately 96 inches in length, a rotational speed range of 20 to 33 RPM may be used. In this regard, increased rotational speed will increase the bulk particle velocity thereby enhancing heat and mass transfer. Due to the complex properties of non-Newtonian powders, empirical correlations for Reynolds number to estimate mixing intensity for evaporative gas-solid separations have little practical value. Through experience, for example, operating a 70 cubic foot blender at 20-33 RPM, sufficient heat and mass transfer rates may be achieved for industrial value. Exceeding 33 RPM may be impractical due to mechanical design constraints and could cause excessive entrainment of powder in the headspace of the vessel and vapor phase exiting the vessel to the vapor condenser. The intense blending achieved with proper blender assembly architecture minimizes the risk of particle entrainment relative to alternative drying devices with rotating shafts, such as V-blenders and rota-cone blenders.

In yet another aspect, for example, the invention provides a system for the recovery of solvent and/or botanical compounds from a feedstock. In accordance with certain example embodiments, the system may comprise a ribbon blender assembly comprising (a) a feedstock inlet, (b) an internal chamber configured to house a feedstock material, (c) a jacket configured to receive a heating medium and transfer heat from the heating medium to the internal chamber, (d) one or more ribbons configured to agitate the feedstock material located in the internal chamber, (e) a feedstock discharge, and (f) a vapor outlet. The system may also include a heat source (e.g., steam supply, heated oil supply, etc.) in operative communication with the jacket of the ribbon blender assembly. The system may also include a condenser in operative communication with the vapor outlet. In accordance with certain example embodiments, the system may be devoid of a motive gas inlet for contacting the feedstock with a motive gas stream.

In accordance with certain example embodiments, the system may comprise a vacuum source (e.g., a vacuum pump) in operative communication with the internal chamber of the ribbon blender assembly and the condenser. For example, the condenser may be located between the internal chamber and the vacuum source. As also noted previously, the system may include a ribbon blender assembly in which the feedstock inlet is located at or proximate a first end of the ribbon blender assembly, and the feedstock discharge is located at or proximate a second end of the ribbon blender assembly. As also noted previously, the one or more ribbons of the ribbon blender assembly may comprise a first section having a first configuration proximate the feedstock inlet, and a second section having a second configuration proximate the feedstock discharge.

Working Examples

The present disclosure is further illustrated by the following working examples, which in no way should be construed as being limiting. That is, the specific features described in the following examples are merely illustrative and not limiting.

Solvent Recovery Example 1

A solvent recovery process according to FIG. 1 that utilized a ribbon blender assembly according to FIG. 3 was employed to recover bound solvent from solvent-laden biomass (marc). As previously described the solvent recovery process utilized the following major equipment: ribbon blender assembly comprising a jacket, recirculating fluid heater, fin-fan fluid cooler, condenser, and condensate receiver tank. For the solvent recovery process, a measured weight (e.g., approximately 850 pounds) of the solvent-laden marc was first loaded into the top of the ribbon blender assembly through the grated manway (e.g., the feedstock inlet). Once the ribbon blender assembly was full (leaving ~25% void volume for adequate mixing) and ready to begin mixing, the manway was sealed, and the mixer motor was started at 20-33 RPM. Next, the recirculating fluid heater was turned on and set to 350° F., to heat the hot oil heat transfer fluid and pump this fluid at approximately 60 gallons a minute through the jacket of the ribbon blender assembly, thereby heating its contents (i.e., the marc housed in the ribbon blender assembly). During the slow heat-up of the ribbon blender assembly, the water supply was opened to provide cooling duty at approximately 65° F. and 10 gallons per minute to the condenser, which ultimately condensed solvent vapors flowing through a sloped vapor duct, as they are generated from the ribbon blender assembly. The condensed solvent was then allowed to flow (e.g., out the discharge valve of the condenser) by gravity to a vented condensate receiver tank (50 gallons). As the solvent recovery rate slowed, the recirculating heater temperature was ramped up to 400° F. to ensure the marc was completely solvent-free. For instance, in a 6-hour cycle time, approximately 20 gallons of solvent was recovered from 850 pounds of the solvent-laden marc, previously spun at, for example, 1500 RPM for at least 5 minutes in a centrifugal biomass extractor.

Solvent Recovery Example 2

The same process and equipment layout as noted above was utilized to process an additional batch of 700 lbs of solvent-laden hemp biomass from a 30# batch cryo-centrifuge extractor spun at 1500 RPM for at least 3 minutes. The hot oil jacket temperature was set at 210° F. The condenser cooling water temperature was set at 67° F. The solvent-laden hemp biomass was mixed and heated in the jacketed ribbon blender assembly for 11 hours. The volume of solvent recovered was 21.4 gallons. The biomass exiting from the jacketed ribbon blender assembly after processing was analyzed for solvent concentration. There was no detectible level of solvent in the biomass exiting the jacketed ribbon blender assembly after processing for solvent recovery.

Botanical Compound Recovery Example 1

A botanical vacuum evaporation process as illustrated in FIG. 2 that utilized a ribbon blender assemble shown in FIG. 3 was successfully employed to recover thermally-sensitive, low-boiling target botanical compounds. The vacuum evaporation process, as previously noted, employed the following major equipment: jacketed ribbon blender assembly, recirculating fluid heater, fin-fan fluid cooler, recirculating fluid chiller, condenser, condensate receiver tank, cold trap, and vacuum pump. Approximately 650 pounds of the dried, milled hemp biomass was first loaded into the top of the ribbon blender through the grated manway. Once the ribbon blender was full (leaving ~25% void volume for adequate mixing), the manway was sealed and the mixer may be started at 20-33 RPM. Next, the recirculating fluid heater was turned on and set to 110° F., to heat the hot oil heat transfer fluid and pump this fluid at approximately 60 gallons per minute through the jacket of the ribbon blender assembly, thereby heating its contents. During the slow heat-up of the ribbon blender assembly, the recirculating fluid chiller was turned on to provide cooling duty at approximately −40° F. and 3 gallons per minute for the condenser, which ultimately condensed the vaporized botanical target compounds (e.g., terpene vapors) that were generated from the ribbon blender assembly. The solvent-free, condensed terpenes were then allowed to flow by gravity to a vented condensate receiver tank (5 gallons). Optionally, the receiver tank may be drained during the process, using a vacuum relief manifold, to recover various terpene fractions as process conditions are adjusted. As the terpene recovery rate slowed, the recirculating heater temperature was ramped up as high as 150° F.-180° F. to ensure some or all thermally-sensitive, low-boiling terpenes were recovered. Approximately 3.7 liters of terpenes were recovered from 650 pounds of dried, milled hemp biomass during a 6-hour batch cycle.

Botanical Compound Recovery Example 2

The same process and equipment layout as noted above was utilized to process an additional batch of 500 lbs of fresh, milled hemp biomass (ideally combine-harvested wet and trucked directly to the factory from the field within 90 minutes of harvest). The hemp biomass included 2.43% by weight of total terpene content and 67.2% by weight of moisture (e.g., water). The hot oil jacket temperature was set from 150-250° F. (i.e., stepped in a linear gradient at 100° F. every 30-45 minutes, depending on terpene profile and moisture content). The condenser cooling water temperature was set to 100° F. The cold trap temperature was set to −40° F. The cycle time for the mixing and heating of the hemp biomass was 10 hours. The volume of terpenes recovered was 6.2 L. The volume of dilute "hydrosol" recovered was 52.9 Gallons. The terpene concentration of the exiting biomass was analyzed. No detectable level of terpenes was found in the exiting/processed hemp biomass. The moisture content of the exiting/processed hemp biomass was below 1% by weight.

Many modifications to the example embodiment provided herein, as well as other example embodiments, will come to mind to one skilled in the art to which these example embodiments pertain having the benefit of the teachings presented in the foregoing descriptions and the associated drawings. Therefore, it is to be understood that the example embodiments are not to be limited to the specific ones disclosed and that modifications and other embodiments are intended to be included within the scope. Moreover, although the foregoing descriptions and the associated drawings describe example embodiments in the context of certain example combinations of elements or functions, it should be appreciated that different combinations of elements or functions may be provided by alternative embodiments without departing from the scope. In this regard, for example, different combinations of elements or functions than those explicitly described above are also contemplated. In cases where advantages, benefits or solutions to problems are described herein, it should be appreciated that such advantages, benefits or solutions may be applicable to some example embodiments, but not necessarily all example embodiments. Thus, any advantages, benefits or solutions described herein should not be thought of as being critical, required, or essential to all embodiments or to that which is claimed herein. Although specific terms are employed herein, they are used in a generic and descriptive sense only and not for purposes of limitation.

That which is claimed:

1. A botanical evaporation process for recovering a botanical compound from a feedstock, comprising:
   (i) feeding the feedstock into a heated mixing device, wherein the feedstock comprises solid media of dried, size-reduced plant material that includes the botanical compound for recovery and is devoid of organic solvent;
   (ii) simultaneously mixing and heating the feedstock within the heated mixing device under a vacuum;
   (iii) forming a vaporized botanical compound within the heated mixing device;
   (iv) passing the vaporized botanical compound from the heated mixing device into a condenser; and
   (v) condensing the vaporized botanical compound in the condenser to form a recovered botanical compound wherein the process is devoid of a motive gas stream contacting the feedstock during processing.

2. The process of claim 1, wherein the size-reduced plant material comprises a milled hemp biomass material.

3. The process of claim 1, wherein heating the feedstock within the heated mixing device comprises indirectly heating the feedstock.

4. The process of claim 1, wherein the heated mixing device comprises a jacketed ribbon blender, wherein a heating medium is circulated through a jacket of the jacketed ribbon blender.

5. The process of claim 1, wherein the feedstock has an original botanical compound content and the process removes from about 95% to about 100% of the original botanical compound content.

6. The method of claim 1, wherein heating the feedstock within the heated mixing device comprises heating the feedstock to about 150 to about 250° C. for about 1 to about 15 hours, and wherein the vacuum comprises from about 1000 microns absolute pressure or lower.

7. The method of claim 1, wherein the botanical biomass has an original amount of the botanical compound at the onset of the process, and wherein the process further comprises discharging the botanical biomass from the heated mixing device after at least 90% by weight of the original amount of the botanical compound has been removed from the botanical biomass.

8. The method of claim 1, further comprising a step of pre-grinding and reducing an average size of the feedstock prior to feeding the feedstock into the heated mixing device.

* * * * *